(12) United States Patent  
Goldberg et al.

(10) Patent No.: US 7,519,164 B1  
(45) Date of Patent: Apr. 14, 2009

(54) SYSTEM AND METHOD FOR SENDING INFORMATION BETWEEN USERS WITH A TELEPONIC DEVICE WHILE A CALL IS IN PROGRESS

(75) Inventors: Itzhack Goldberg, Hadera (IL); Aviad Zlotnick, Netofah (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/060,448

(22) Filed: Apr. 1, 2008

(51) Int. Cl.
*H04M 1/64* (2006.01)
*H04M 3/42* (2006.01)
*H04L 29/08* (2006.01)

(52) U.S. Cl. .............................. 379/88.11; 379/201.04; 455/414.4

(58) Field of Classification Search ........................ None
See application file for complete search history.

(56) References Cited

U.S. PATENT DOCUMENTS 4,837,800 A       6/1989   Freeburg et al.

(Continued)

FOREIGN PATENT DOCUMENTS

KR          2003030102          4/2003

(Continued)

OTHER PUBLICATIONS

Howat, Faris. "Product Review: Nokia 121 Portable"; *Cellular Business* v10n8, pp. 34-42. Aug. 1993. ISSN: 0741-6520 Journal Code: CLB, 2008 ProQuest Info & Learning. 00745266; 93-94487.

(Continued)

*Primary Examiner*—Curtis Kuntz
*Assistant Examiner*—Joseph T Phan
(74) *Attorney, Agent, or Firm*—Oppenheimer Wolff & Donnelly LLP

(57) ABSTRACT

A method for sending one or more telephone numbers between a first telephonic device and a second telephonic device while a telephone call is in progress comprises initiating a telephone call between a first telephonic device and a second telephonic device, entering a plurality of digits into a keypad of the first telephonic device to generate a plurality of dual-tone multi-frequency signals, measuring an elapsed time between the entry of each of the digits, comparing the elapsed time between the entry of each of the digits with a standard inter-digit time gap, determining a number of digit sequences entered based upon the comparison of the elapsed time between the entry of each of the digits and the standard inter-digit time gap, wherein the number of digit sequences entered corresponds with one or more telephone numbers, detecting the dual-tone multi-frequency signals with the digital signal processor of the second telephonic device, decoding the detected dual-tone multi-frequency signals with the digital signal processor in order determine the one or more telephone numbers typed into the keypad, storing the one or more decoded telephone numbers in the temporary memory of the second telephonic device, displaying the one or more telephone numbers on the display of the second telephonic device, terminating the telephone call between the first and second telephonic devices, accessing the one or more decoded telephone numbers stored in the temporary memory, and storing the one or more decoded telephone number in the non-volatile memory of the second telephonic device.

1 Claim, 2 Drawing Sheets

U.S. PATENT DOCUMENTS

| | | | |
|---|---|---|---|
| 4,975,948 A | 12/1990 | Andresen et al. | |
| 5,119,412 A | 6/1992 | Attallah | |
| 5,241,587 A | 8/1993 | Horton et al. | |
| 5,351,287 A | 9/1994 | Bhattacharyya et al. | |
| 5,361,297 A | 11/1994 | Ortiz et al. | |
| 5,459,773 A | 10/1995 | Hwang | |
| 5,684,858 A | 11/1997 | Hartmann et al. | |
| 5,722,087 A * | 2/1998 | Ala-Mursula et al. | 455/564 |
| 5,732,133 A * | 3/1998 | Mark | 379/357.03 |
| 5,828,739 A | 10/1998 | Nakanishi | |
| 5,963,875 A * | 10/1999 | Go | 455/564 |
| 6,453,178 B1 * | 9/2002 | Zicker et al. | 455/564 |
| 6,654,619 B1 * | 11/2003 | Zicker et al. | 455/564 |
| 6,938,166 B1 | 8/2005 | Sarfati et al. | |
| 7,020,269 B1 | 3/2006 | Park et al. | |
| 7,027,580 B2 | 4/2006 | Gamble | |
| 7,082,106 B2 | 7/2006 | Sharma et al. | |
| 7,142,846 B1 | 11/2006 | Henderson | |
| 7,251,318 B1 | 7/2007 | Henderson | |
| 7,254,223 B1 | 8/2007 | Henderson | |
| 7,257,210 B1 | 8/2007 | Henderson | |
| 7,266,186 B1 | 9/2007 | Henderson | |
| 7,274,779 B2 | 9/2007 | Casey | |
| 7,286,658 B1 | 10/2007 | Henderson | |
| 7,305,076 B1 | 12/2007 | Henderson | |
| 7,308,088 B1 | 12/2007 | Henderson | |
| 7,310,416 B1 | 12/2007 | Henderson | |
| 2002/0196931 A1 | 12/2002 | Heo et al. | |
| 2005/0135573 A1 | 6/2005 | Harwood et al. | |
| 2006/0159060 A1 | 7/2006 | Fotta et al. | |
| 2006/0240806 A1 | 10/2006 | Demirbasa et al. | |
| 2007/0050453 A1 | 3/2007 | Carthern | |
| 2007/0141894 A1 | 6/2007 | McGinley et al. | |
| 2007/0164704 A1 | 7/2007 | McGinley et al. | |
| 2007/0232286 A1 * | 10/2007 | Kim et al. | 455/418 |
| 2008/0014869 A1 | 1/2008 | Demirbasa et al. | |
| 2008/0045265 A1 | 2/2008 | Yach et al. | |

FOREIGN PATENT DOCUMENTS

| | | |
|---|---|---|
| KR | 2005104519 | 11/2005 |
| KR | 2006129760 | 12/2006 |

OTHER PUBLICATIONS

*Teleconnect*, v7, n7, p. 54(7). Jul. 1989. ISSN: 0740-9354 (buyer's guide), Gale Group Computer DB(TM) 2008 *The Gale Group*. 01306997. Supplier No. 07449934. One & Two Lines Phones.

* cited by examiner

SYSTEM AND METHOD FOR SENDING INFORMATION BETWEEN USERS WITH A TELEPONIC DEVICE WHILE A CALL IS IN PROGRESS

FIELD OF THE INVENTION

The present invention relates in general to a system and method of sending information between two or more users with a telephonic device. More particularly, the present invention relates to a system and method of sending information between two or more users with a telephonic device while a telephone call is in progress, and allowing the information to be used by the receiving party upon termination of the telephone call.

BACKGROUND OF THE INVENTION

Telephonic devices remain one of the most popular and often-used modes of communication between individuals. This is especially true since the advent of cellular phones, which enable people to be more "connected" than ever before. The use of telephonic devices such as cellular phones, traditional land lines, and internet-based phones is not only convenient, but it is also less time consuming when compared to in-person meetings and conversations.

One drawback to communicating via a telephonic device rather than in person is the obstacles presented when one of the individuals wants to exchange information with the individual they are speaking with for later use or reference by the individual. For example, during a telephone call people frequently exchange phone numbers of third parties. These numbers are communicated by voice over the telephonic devices, and the recipient of the phone number must either memorize or write down the number for later use or reference. However, the memorization of phone numbers is error prone. Furthermore, often times people do not have a writing instrument and paper readily accessible in order to write down the phone number by hand. As a result, the individual must divert his or her attention away from the telephone call in order to find a writing instrument and/or paper, thus disrupting the flow of the conversation.

Therefore, there is a need for a system and method that allows a first user to send information, such as a telephone number, to a second user via a telephonic device while a telephone call is in progress, and that allows the second user to capture and utilize the sent information after the telephone call has been completed.

BRIEF SUMMARY OF THE INVENTION

The present invention solves the foregoing problems by providing a method for sending one or more telephone numbers between a first telephonic device and a second telephonic device while a telephone call is in progress comprising initiating a telephone call between a first telephonic device and a second telephonic device, wherein the first and second telephonic devices each include a display, a keypad, a digital signal processor, temporary memory, and non-volatile memory, entering a plurality of digits into the keypad of the first telephonic device after the telephone call has been initiated to generate a plurality of dual-tone multi-frequency signals corresponding to the digits typed into the keypad, measuring an elapsed time between the entry of each of the digits, comparing the elapsed time between the entry of each of the digits with a standard inter-digit time gap, determining a number of digit sequences entered based upon the comparison of the elapsed time between the entry of each of the digits and the standard inter-digit time gap, wherein the number of digit sequences entered corresponds with one or more telephone numbers, detecting the dual-tone multi-frequency signals with the digital signal processor of the second telephonic device, decoding the detected dual-tone multi-frequency signals with the digital signal processor of the second telephonic device in order determine the one or more telephone numbers typed into the keypad of the first telephonic device, storing the one or more decoded telephone numbers in the temporary memory of the second telephonic device, displaying the one or more telephone numbers on the display of the second telephonic device, terminating the telephone call between the first and second telephonic devices, accessing the one or more decoded telephone numbers stored in the temporary memory, and storing the one or more decoded telephone number in the non-volatile memory of the second telephonic device.

DETAILED DESCRIPTION OF THE INVENTION

One exemplary embodiment of the present invention enables a first telephonic device to detect and decode Dual-Tone Multi-Frequency (DTMF) tones resulting from the actuation of number keys on a second telephone device in order to send information from the second telephonic device to the first telephonic device. The information may include, for example, a telephone number or a "text" type message. An individual operating the first telephonic device may then utilize the decoded information after completion of the telephone call. Utilizing the decoded information may include, but is not limited to, storing the decoded digits or text as phone numbers or names, or using the decoded digits directly to place a telephone call without first having to store the decoded digits.

As those skilled in the art will appreciate, there is a unique DTMF tone associated with the numbers "0" through "9" on a standard telephonic keypad. In particular, each number "key" on the keypad has two corresponding tones of specific frequencies that are generated. One of the tones is generated from a high frequency group of tones, while the other tone is generated from a low frequency group of tones. The unique combinations of high and low frequency tones may not be imitated by the voice of a telephone user. The present invention relies on the detection and decoding of these tones by the telephonic device receiving the information.

Figure 1:
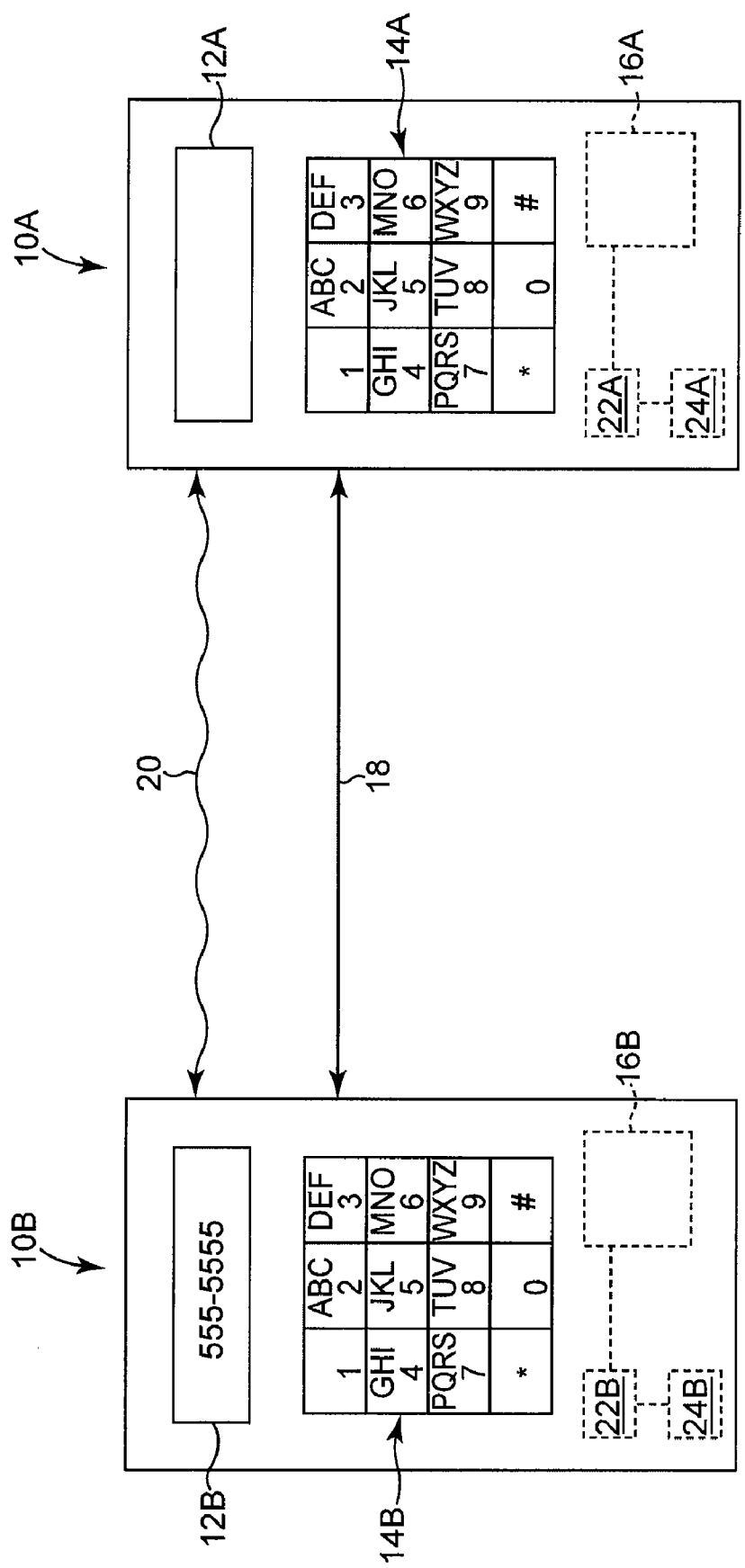
FIG. 1 is a diagram illustrating a telephone conversation between a first user operating a first telephonic device and a second user operating a second telephonic device.

FIG. 1 is a diagram illustrating a telephone conversation between a first user operating first telephonic device 10A and a second user operating a second telephonic device 10B. First telephonic device 10A includes display 12A, keypad 14A, and Digital Signal Processor (DSP) 16A. Similarly, second telephonic device 10B includes display 12B, keypad 14B, and Digital Signal Processor 16B. As shown in FIG. 1, first telephonic device 10A and second telephonic device 10B are connected via a wireless connection 18, although any type of connection may be utilized as will be appreciated by those skilled in the art. Furthermore, although telephonic devices 10A and 10B are shown as cellular telephones, other types of telephonic devices are contemplated such as, for example, landline phones, internet-based phones, and computer systems.

Once connected as shown in FIG. 1, first telephonic device 10A may send information to second telephonic device 10B while the call is in progress, as indicated by signal transmission 20. As illustrated in FIG. 1, this information may include, for example, a numerical sequence corresponding to the phone number of a third party. Digital Signal Processor (DSP) 16B is configured to process all incoming audio signals that occur during a telephone call, detect and decode the DTMF signals, and temporarily store them in temporary memory 22B for later use. The decoded digits may then be displayed on display 12B of second telephonic device 10B as illustrated in FIG. 1. Once the telephone call has been completed, the second user may be presented with numerous options, including permanently storing the digits in non-volatile phone memory 24B as an entry in the user's pone book or utilizing the digits directly to make a telephone call without first having to store the digits in non-volatile phone memory 24B.

Instead of or in addition to displaying the decoded digits on display 12B, the digits may be converted to audio using "text to speech" technology as will be appreciated by those skilled in the art. As a result, display 12B may be optional, or the text to speech feature may be used to confirm the number sequence displayed on display 12B.

As those skilled in the art will appreciate, DSPs 16A and 16B may be selected from any standard, commercially available DSP. For example, either fixed-point or floating point DSPs may be used. Fixed-point DSPs are more common due to their fast processing speed and low cost due to reduced hardware complexity. However, floating point DSPs may be used in order to, for example, reduce the cost and complexity of software in exchange for more expensive hardware because it is generally easier to implement algorithms with floating point DSPs. Alternatively, DSPs 16A and 16B may be replaced with another component capable of performing a similar function. For example, DSP functionality may also be obtained using Field Programmable Gate Array Chips and the like. Thus, any device capable of performing the function of a DSP is contemplated.

In one exemplary embodiment, DSPs 16A and 16B may decode DTMF signals using, for example, the Goertzel algorithm. The Goertzel algorithm is a Digital Signal Processing technique designed to identify frequency components of a signal, such as those associated with DTMF signals produced by the keypad of a telephone. In particular, the Goertzel algorithm may be used to produce a DTMF tone detector, which may then be implemented on a DSP.

Although the embodiment of FIG. 1 illustrates the transfer of information from first telephonic device 10A to second telephonic device 10B, those skilled in the art will appreciate that information may alternatively be transferred from second telephonic device 10B to first telephonic device 10A, or between both first telephonic device 10A and second telephonic device 10B.

Figure 2:
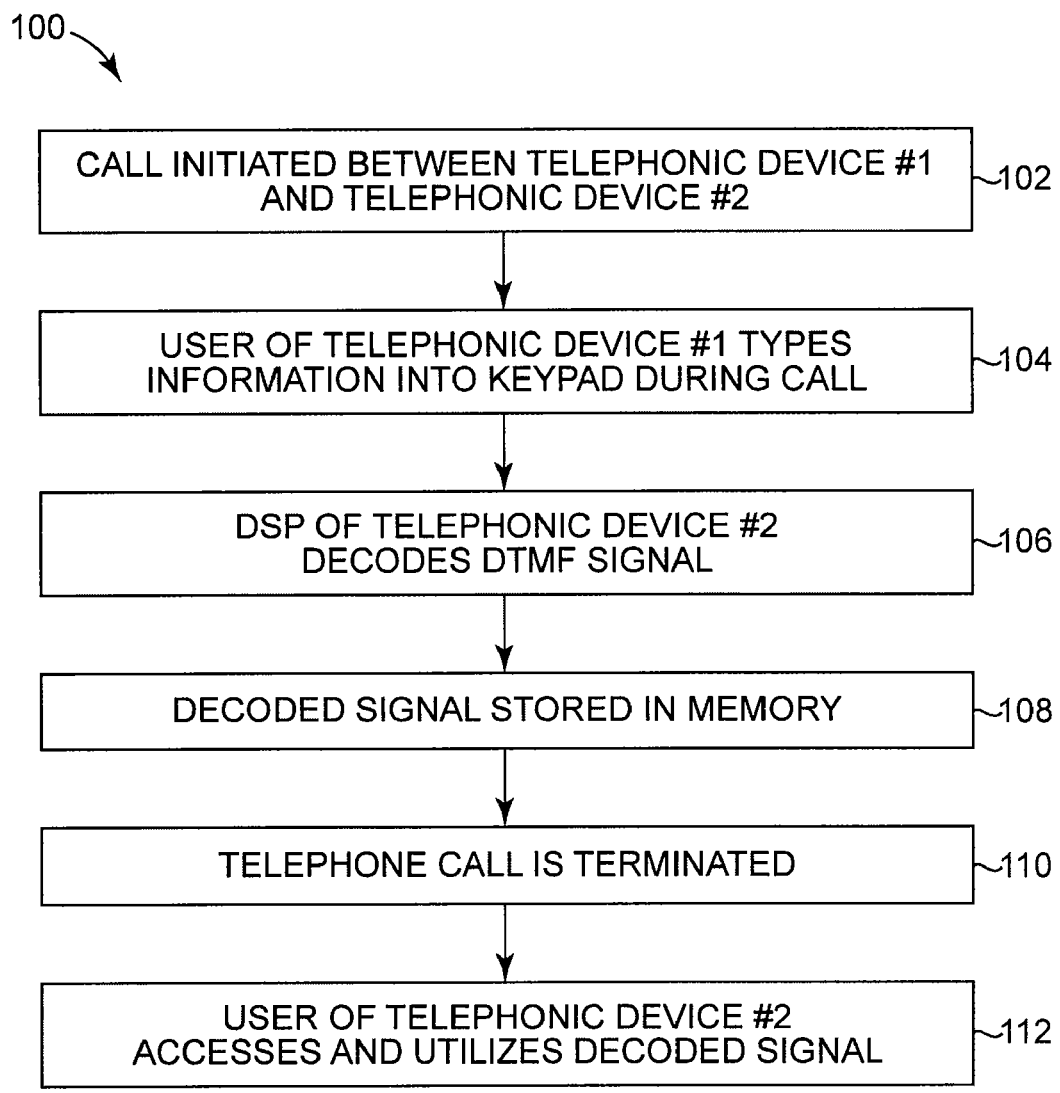
FIG. 2 is a flowchart illustrating one exemplary method of transferring information between two telephonic devices during a telephone call in accordance with the present invention.

Now that a general description of the system of the present invention has been provided, one exemplary method of transferring information between two users during a telephone call will be described with reference to FIG. 2. In particular, method 100 begins in step 102 where a call is initiated between the first user and the second user via telephonic device 10A and telephonic device 10B, respectively. The method continues in step 104 where the first user types information into keypad 14A, such as a sequence of digits corresponding to the telephone number of a third party. Then, in step 106, DSP 16B of telephonic device 10B decodes the DTMF signal generated by the information entered by the first user into keypad 14A. Next, the decoded signal is temporarily stored in temporary memory 22B in step 108 for later use by the second user. The telephone call between the first and second users is thereafter terminated at step 110, at which point the second user may access and utilize the decoded signal that is being temporarily stored in temporary memory 22B.

Method 100 may be extended such that the DSP measures the amount of time that has elapsed between the entry of each digit by pressing a key on the keypad. The elapsed time may then be compared to a "typical" time gap between entries. If any of these "inter-digit" time gaps are longer than the predetermined, typical time gap between entries, then the DSP may split the sequence of digits into multiple sequences prior to displaying them for the user.

The "utilizing" referred to in step 112 of method 100 may take on numerous forms. For example, when the decoded signal represents a telephone number, the user may hit "send" (or a similar button) on the telephonic device in order to directly dial the telephone number. If the decoded signal has been improperly joined or split so as to form an incorrect telephone number, the user interface of the telephonic device may provide the user with the option to correctly split or re-join the decoded signal. Similarly, in situations where the decoded signal represents an incorrect phone number due to an error in entry of the number, the user interface may provide an option for editing the telephone number. If the user decides he or she does not want the decoded signal, then the user interface of the telephonic device may provide a simple step for "discarding" the decoded signal. Finally, the user interface of the telephonic device may provide an option to add the decoded signal to the non-volatile phone memory, such as in the phone book of a cellular phone.

Those skilled in the art will appreciate that although method 100 has been described as sending information from a first telephonic device to a second telephonic device, the method may be extended to also send information from the second telephonic device to the first telephonic device, as well as to send multiple sets of information from one telephonic device to another at discrete periods of time during the telephone call.

Although the previous discussion focused on sending information between telephonic devices that represented sequences of digits corresponding to telephone numbers, those skilled in the art will appreciate that telephonic devices may also send "text" information via keypads that may be decoded to deliver text-type messages. In one embodiment, the DSP of a telephonic device receives and decodes DTMF signals, which are then compared with a dictionary tool that may be used to "guess" the word or words corresponding to the DTMF signals. Such dictionary tools are commercially available and already found on many cellular telephones. Another embodiment takes advantage of the fact that on a typical American alphanumeric keypad, each "number" key represents several "alphabetical letters." For example, the key corresponding to the number "2" typically represents the letters "A," "B," and "C." Therefore, in this embodiment, the user may press the number "2" key once in order to indicate that the letter "A" is intended, twice in order to indicate that the letter "B" is intended, and so on. The DSP of the receiving telephonic device may then decode the message taking into account the both the frequencies and the number of consecutive times that a number key has been pressed. As those skilled in the art will appreciate, the present invention allows a user of a telephonic device to send "text messages" during a phone call, thereby enabling two forms of communication to be utilized simultaneously.

Although the present invention has been described with reference to preferred embodiments, workers skilled in the art will recognize that changes may be made in form and detail without departing from the spirit and scope of the invention.

What is claimed is:

1. A method for sending one or more telephone numbers between a first telephonic device and a second telephonic device while a telephone call is in progress comprising:

initiating a telephone call between a first telephonic device and a second telephonic device, the first and second telephonic devices each including a display, a keypad, a digital signal processor, temporary memory, and non-volatile memory;

entering a plurality of digits into the keypad of the first telephonic device after the telephone call has been initiated to generate a plurality of dual-tone multi-frequency signals corresponding to the digits typed into the keypad;

measuring an elapsed time between the entry of each of the digits;

comparing the elapsed time between the entry of each of the digits with a standard inter-digit time gap;

determining a number of digit sequences entered based upon the comparison of the elapsed time between the entry of each of the digits and the standard inter-digit time gap, wherein the number of digit sequences entered corresponds with one or more telephone numbers;

detecting the dual-tone multi-frequency signals with the digital signal processor of the second telephonic device;

decoding the detected dual-tone multi-frequency signals with the digital signal processor of the second telephonic device in order to determine the one or more telephone numbers typed into the keypad of the first telephonic device;

storing the one or more telephone numbers in the temporary memory of the second telephonic device;

splitting the sequence of digits into multiple sequences prior to displaying them for the second telephonic device user;

providing the second user the option to correctly rejoin the decoded signal on a user interface of the second telephonic device if the decoded signal has been improperly joined or split so as to form an incorrect telephone number;

displaying the one or more telephone numbers on the display of the second telephonic device;

terminating the telephone call between the first and second telephonic devices;

accessing the one or more decoded telephone numbers stored in the temporary memory; and storing the one or more decoded telephone numbers in the non-volatile memory of the second telephonic device.

* * * * *